(12) United States Patent
Groninga et al.

(10) Patent No.: US 12,195,177 B2
(45) Date of Patent: Jan. 14, 2025

(54) DIFFERENTIAL THRUST VECTORING SYSTEM

(71) Applicant: Textron Innovations Inc., Providence, RI (US)

(72) Inventors: Kirk Landon Groninga, Keller, TX (US); Daniel Bryan Robertson, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 149 days.

(21) Appl. No.: 17/752,542

(22) Filed: May 24, 2022

(65) Prior Publication Data
US 2022/0289370 A1    Sep. 15, 2022

Related U.S. Application Data

(62) Division of application No. 16/435,547, filed on Jun. 9, 2019, now Pat. No. 11,338,914.

(51) Int. Cl.
| | |
|---|---|
| *B64C 27/80* | (2006.01) |
| *B64C 5/06* | (2006.01) |
| *B64C 11/00* | (2006.01) |
| *B64C 13/24* | (2006.01) |
| *B64C 27/52* | (2006.01) |
| *B64C 27/57* | (2006.01) |
| *B64C 27/58* | (2006.01) |
| *B64C 29/00* | (2006.01) |
| *B64U 10/17* | (2023.01) |
| *B64U 30/26* | (2023.01) |
| *B64U 30/297* | (2023.01) |

(Continued)

(52) U.S. Cl.
CPC ............... *B64C 27/80* (2013.01); *B64C 5/06* (2013.01); *B64C 11/001* (2013.01); *B64C 13/24* (2013.01); *B64C 27/52* (2013.01); *B64C 27/57* (2013.01); *B64C 27/58* (2013.01); *B64C 29/0033* (2013.01); *B64U 10/17* (2023.01); *B64U 30/297* (2023.01); *B64U 50/18* (2023.01); *F16H 1/28* (2013.01); *B64U 30/26* (2023.01)

(58) Field of Classification Search
CPC ........ B64C 27/80; B64C 5/06; B64C 11/001; B64C 13/24; B64C 27/52; B64C 27/57; B64C 27/58; B64C 29/0033; B64C 27/28; F16H 1/28; B64U 30/297; B64U 50/18
See application file for complete search history.

(56) References Cited

U.S. PATENT DOCUMENTS

| | | | |
|---|---|---|---|
| 6,719,244 B1 * | 4/2004 | Gress | B64C 29/0033 244/7 R |
| 8,256,704 B2 * | 9/2012 | Lundgren | B64C 39/024 244/7 C |

(Continued)

FOREIGN PATENT DOCUMENTS

EP    2690012 A1 *   1/2014  ............ B64C 27/26

*Primary Examiner* — Joshua J Michener
*Assistant Examiner* — Cindi M Curry
(74) *Attorney, Agent, or Firm* — Lightfoot & Alford PLLC

(57) ABSTRACT

A differential thrust vectoring system includes a first thruster, a second thruster, a main actuator, and a trim actuator. The system is configured such that actuation of the main actuator causes rotation of the thrusters together about an axis, whereas actuation of the trim actuator causes relative rotation of the first and second thrusters about the axis.

13 Claims, 11 Drawing Sheets

(51) Int. Cl.
*B64U 50/18* (2023.01)
*F16H 1/28* (2006.01)

(56) References Cited

U.S. PATENT DOCUMENTS

| | | | |
|---|---|---|---|
| 10,279,901 B2 * | 5/2019 | Ivans | B64D 33/02 |
| 11,325,719 B2 * | 5/2022 | Foskey | B64C 29/0033 |
| 2011/0284684 A1 * | 11/2011 | Amraly | B64D 35/04 |
| | | | 244/12.4 |
| 2018/0086446 A1 * | 3/2018 | Alber | B64D 35/08 |

\* cited by examiner

DIFFERENTIAL THRUST VECTORING SYSTEM

BACKGROUND

Similar to tiltrotor aircraft, compound helicopters aspire to combine the vertical takeoff and landing, as well as hovering, capabilities of a traditional helicopter with the range and speed of an airplane. In order to accomplish this goal, compound helicopters generally include a traditional helicopter rotor to provide lift and directional thrust during low-speed horizontal movement and forward-facing thrusters and fixed wings to provide forward thrust and vertical lift in high speed forward-flight. Various types of forward-facing thrusters have been included on compound helicopters, including jet engines and propellers. Various means have also been implemented to counter the torque effect of the main rotor, such as including a traditional tail rotor, having different blade pitch on the opposing forward-facing propellers, or by using coaxial contra-rotating rotors.

Placing a fan inside a duct can result in a system that produces more thrust for the same power. This increase in thrust is produced because the shape of the duct allows the duct to carry a thrust force. In order to maximize efficiency, ducts typically place the fan in a generally cylindrical section of the duct and include a generally quarter toroidal inlet upstream of the fan and a generally frusto-conical diffuser section downstream of the fan. This arrangement accelerates the air across the inlet and decelerates the air at the diffuser, thereby creating a pressure differential on the duct across the fan disk, resulting in additional thrust. However, the duct must have a sufficient length to fully decelerate the airflow in order to maximize the additional thrust. As such, fitting ducts around the forward-facing propellers of a compound helicopter would create large surfaces that would suffer ill effects from the downwash of the main rotor while hovering.

DETAILED DESCRIPTION

Figure 1:
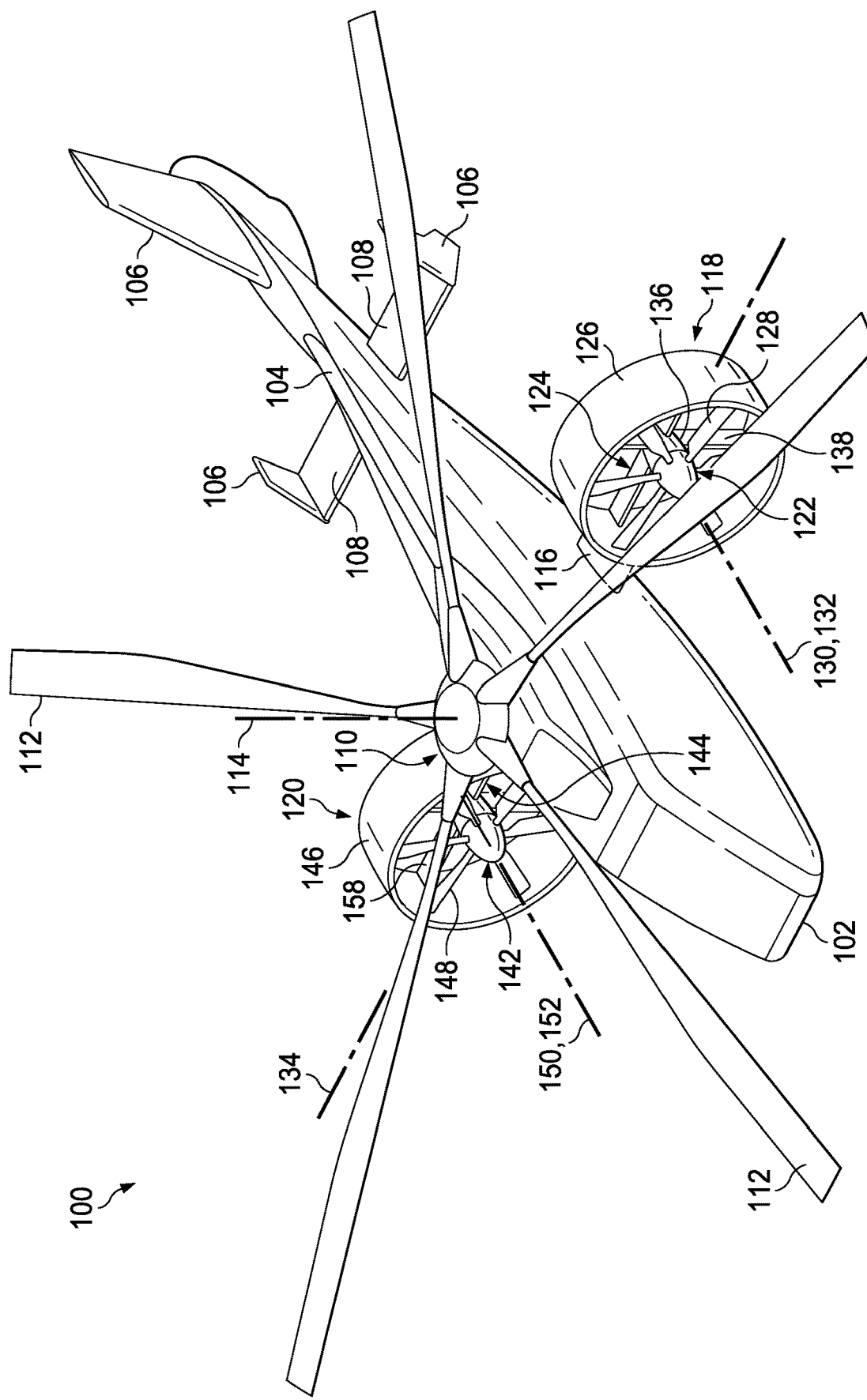
FIG. 1 is an oblique view of an aircraft in a forward-flight mode with thrusters having aligned thrust vectors, according to this disclosure.

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges differential thrust vectoring systems and an aircraft for use thereon. Each differential thrust vectoring system disclosed herein is configured to enable rotation of a pair of thrusters of an aircraft relative to the fuselage by varying amounts. The differential thrust vectoring systems include a first thruster rotation assembly with a first spindle coupled for common rotation with a first thruster and a second thruster rotation assembly with a second spindle coupled for common rotation with a second thruster. The differential thrust vectoring systems enable the thrusters to rotate between a hover position, wherein the thrust vectors are in a generally vertical orientation providing lift to the aircraft, and a forward-flight position, wherein the thrust vectors are in a generally horizontal position providing forward thrust to the aircraft.

At least one embodiment includes a main actuator configured to commonly rotate the first and second spindle and a trim actuator configured to rotate one of the first and second spindles relative to the other. When the thrusters are in the hover position, the differential thrust vectoring system may rotate the thrusters relative to each other for providing yaw and/or anti-torque functionality. When the thrusters are in the forward-flight position, the differential thrust vectoring system may rotate the thrusters relative to each other for providing roll functionality.

At least a second embodiment includes a single actuator and a planetary gear system coupled between the first and second spindles. The actuator causes both spindles to rotate, but the planetary gear system is configured to cause the first and second spindles to rotate at different rates. In this embodiment, the thrust vectors are fixed in a generally parallel orientation in the forward-flight position and the thrust vectors are automatically skewed to a predetermined deviation angle when rotated to the hover position.

Figure 2:
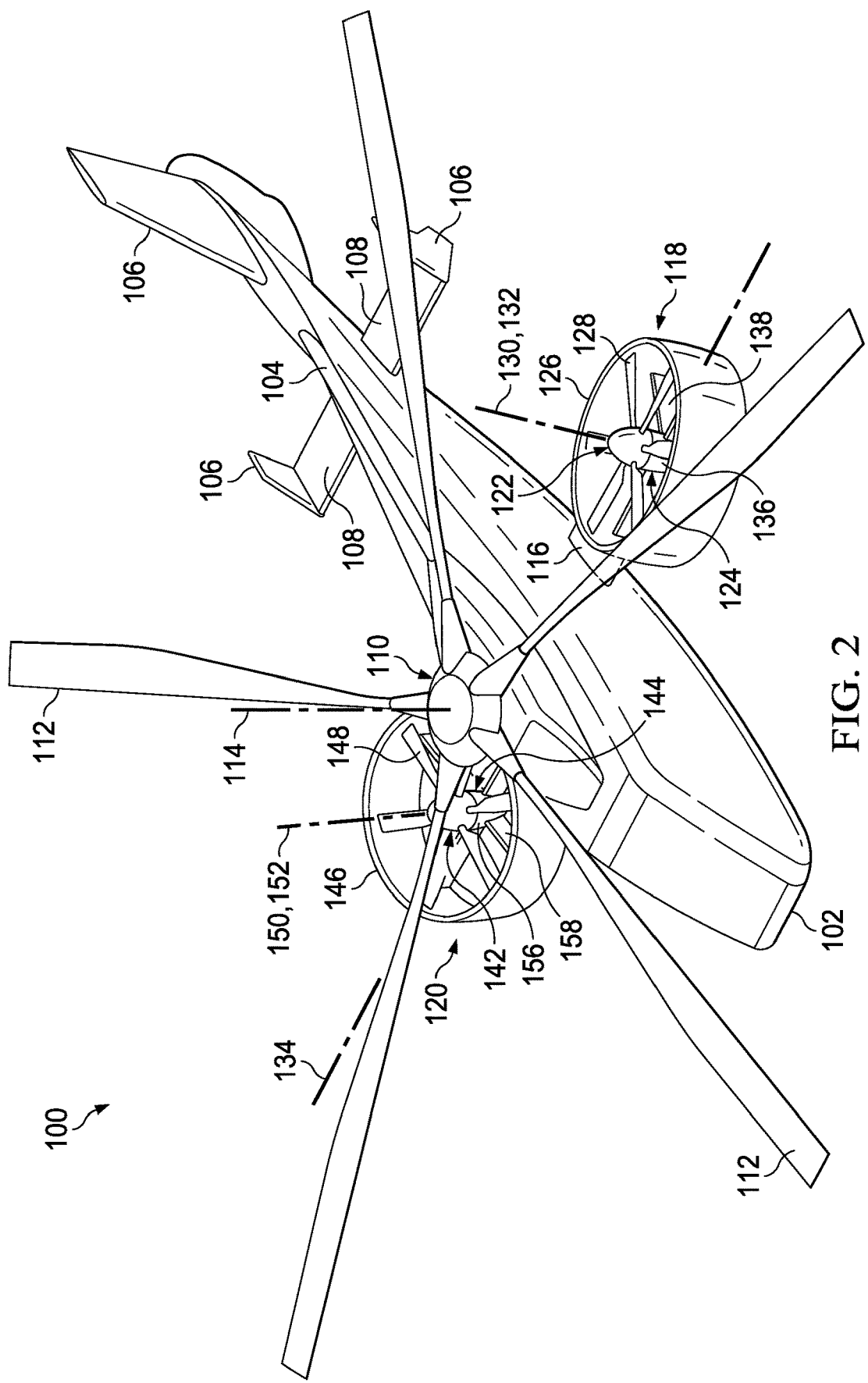
FIG. 2 is an oblique view of the aircraft of FIG. 1 in a hover mode with the thrusters having skewed thrust vectors.

FIGS. 1 and 2 show an aircraft 100 that is convertible between a forward-flight mode, which allows for high-speed forward-flight as well as horizontal takeoff and landing (shown in FIG. 1) and a hover mode, which allows for vertical takeoff and landing, hovering, and low speed directional movement (shown in FIG. 2). Aircraft 100 includes a fuselage 102 coupled to an airframe housed therein, a tail section 104 including vertical stabilizers 106 and horizontal stabilizers 108, a main rotor 110 including a plurality of main rotor blades 112 configured to rotate about a main mast axis 114, wings 116 extending from either side of fuselage 102, a first thruster 118 positioned at an outboard end of one wing 116, and a second thruster 120 positioned at an outboard end of the other wing 116.

Figure 3:
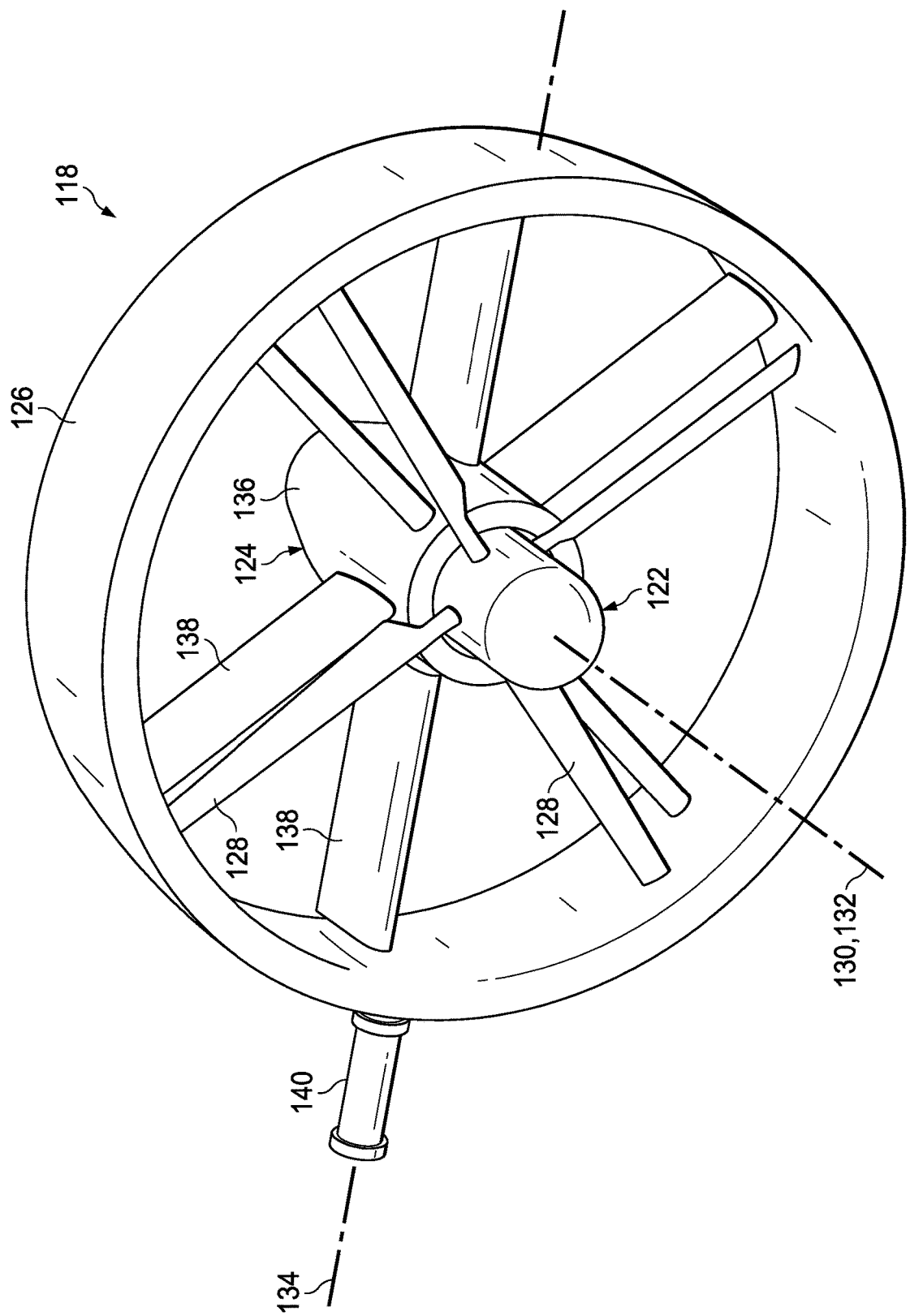
FIG. 3 is an oblique view of a thruster of the aircraft of FIG. 1

As best shown in FIG. 3, first thruster 118 comprises a ducted fan including a rotor assembly 122, a stator assembly 124, and a duct 126 surrounding rotor assembly 122 and stator assembly 124. Rotor assembly 122 includes a plurality of rotor blades 128 configured to rotate about a mast axis 130. Rotation of rotor blades 128 about mast axis 130 generates thrust along a first thrust vector 132 that is coaxial with mast axis 130. The direction of first thrust vector 132 may be modified by using a differential thrust vectoring system, as described below, to rotate first thruster 118 about a tilt axis 134. Stator assembly 124 is positioned downstream of rotor blades 128 and includes a stator hub 136 centrally located within duct 126 and a plurality of stator vanes 138 coupled between duct 126 and stator hub 136. Stator hub 136 houses a mechanism therein configured to provide rotational energy to rotor assembly 122. The mechanism may comprise an electric motor configured to produce rotational energy. Alternatively, the mechanism may comprise a gearbox therein configured to deliver rotational energy to rotor assembly 122, wherein the gearbox receives rotational energy from a driveshaft passing through an attachment post 140 and the adjacent stator vane 138. The magnitude of first thrust vector 132 may be modified by including collective control of the pitch of rotor blades 128 and/or speed control of the mechanism configured to provide rotational energy. To provide additional thrust control, stator vanes 138 may be moveable. Movement of stator vanes 138 may enable first thrust vector 132 to deviate from mast axis 130.

First thruster 118 and second thruster 120 are structurally similar. As such, second thruster 120 also comprises a ducted fan including a rotor assembly 142, a stator assembly 144, and a duct 146 surrounding rotor assembly 142 and stator assembly 144. Rotor assembly 142 includes a plurality of rotor blades 148 configured to rotate about a mast axis 150. Rotation of rotor blades 148 about mast axis 150 generates thrust along a second thrust vector 152 that is coaxial with mast axis 150. The direction of second thrust vector 152 may be modified by using a differential thrust vectoring system, as described below, to rotate second thruster 120 about tilt axis 134. Stator assembly 144 is positioned downstream of rotor blades 148 and includes a stator hub 156 centrally located within duct 146 and a plurality of stator vanes 158 coupled between duct 146 and stator hub 156. Stator hub 156 houses a mechanism therein configured to provide rotational energy to rotor assembly 142. The mechanism may comprise an electric motor configured to produce rotational energy. Alternatively, the mechanism may comprise a gearbox therein configured to deliver rotational energy to rotor assembly 142, wherein the gearbox receives rotational energy from a driveshaft passing through an attachment post and the adjacent stator vane 158. The magnitude of second thrust vector 152 may be modified by including collective control of the pitch of rotor blades 148 and/or speed control of the mechanism configured to provide rotational energy. To provide additional thrust control, stator vanes 158 may be moveable. Movement of stator vanes 158 may enable second thrust vector 152 to deviate from mast axis 150. While first thruster 118 and second thruster 120 are shown as ducted fans, it should be understood that first thruster 118 and second thruster 120 could comprise any type of mechanism capable of producing thrust.

Referring again to FIG. 1, aircraft 100 is shown in forward-flight mode, wherein first thrust vector 132 and second thrust vector 152 are generally horizontal and in a substantially parallel relationship. It should be understood that first thrust vector 132 and second thrust vector 152 may deviate from parallel by a few degrees depending on airflow around fuselage 102. As such, for this specification and the claims appended hereto, the phrase "substantially parallel" should include vectors within three degrees of parallelism. With first thruster 118 and second thruster 120 generating forward thrust, lift is generated by wings 116. Depending on the forward airspeed and the configuration of wings 116, wings 116 may provide a substantial percentage of the lift required to maintain altitude. In this scenario, main rotor 110 may simply be allowed to autorotate and maneuverability of aircraft 100 may be provided by including rudders and/or elevators on the trailing ends of vertical stabilizers 106 and/or horizontal stabilizers 108, respectively. As discussed below, the differential thrust vectoring system may enable relative rotation of first thrust vector 132 and second thrust vector 152 providing roll functionality in forward-flight mode. If wings 116 do not provide sufficient lift, rotational energy is provided to main rotor 110 and lift as well as directional thrust is generated by main rotor blades 112, which may be collectively or cyclically pitched. When rotational energy is provided to main rotor 110 in forward-flight mode, vertical stabilizers 106 may provide sufficient anti-torque to counter the torque effects of main rotor 110.

Referring now to FIG. 2, aircraft 100 is shown in hover mode, wherein first thrust vector 132 and second thrust vector 152 are generally vertical and are skewed. In hover mode, rotational energy is provided to main rotor 110 and lift as well as directional thrust is generated by main rotor blades 112, while first thruster 118 and second thruster 120 generate additional lift. In addition, the skewed orientation of first thrust vector 132 and second thrust vector 152 provides anti-torque to overcome the torque effects of main rotor 110. As described below, the differential thrust vectoring system may enable the angle between first thrust vector 132 and second thrust vector 152 to vary, thereby providing yaw control of aircraft 100. Yaw control may also be provided by adjusting the magnitude of first thrust vector 132 and/or second thrust vector 152, as described above. Alternatively, or additionally, aircraft 100 may include other conventional anti-torque/yaw control mechanisms such as a tail rotor or NOTAR system.

Figure 4A:
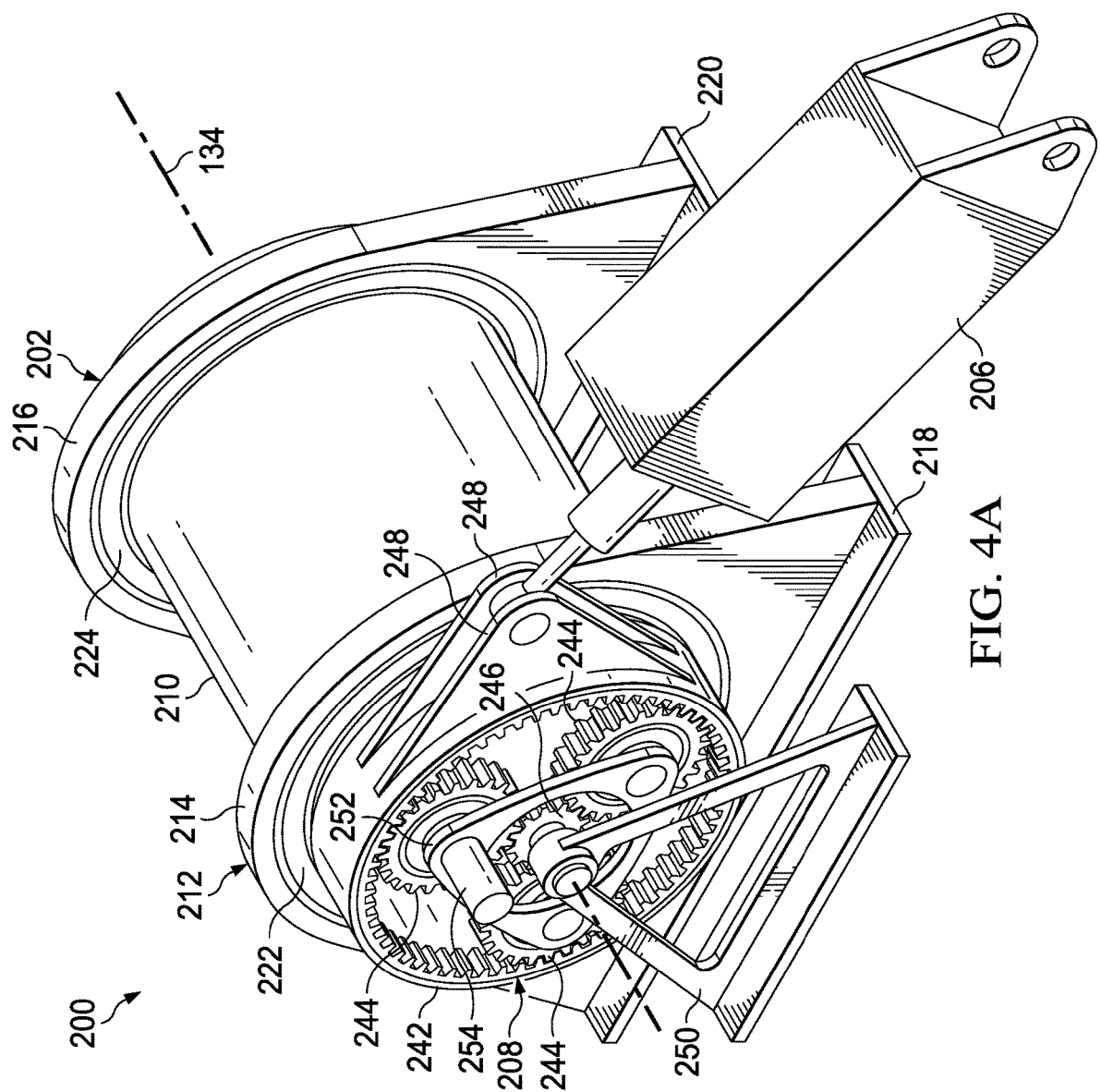
FIG. 4A is an oblique view of a first portion of a differential thrust vectoring system, according to this disclosure.
Figure 4B:
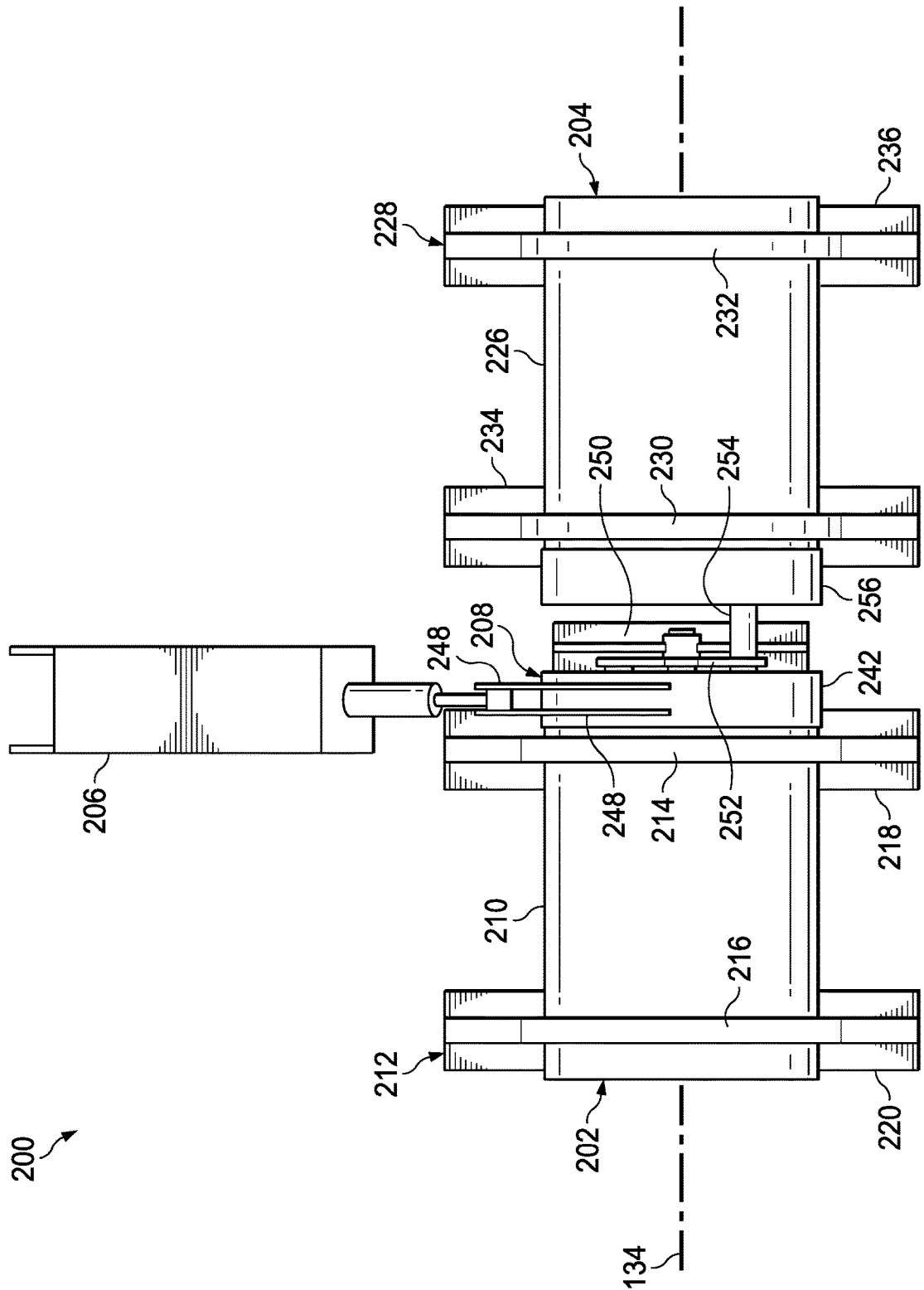
FIG. 4B is a top view of the differential thrust vectoring system of FIG. 4A.
Figure 4C:
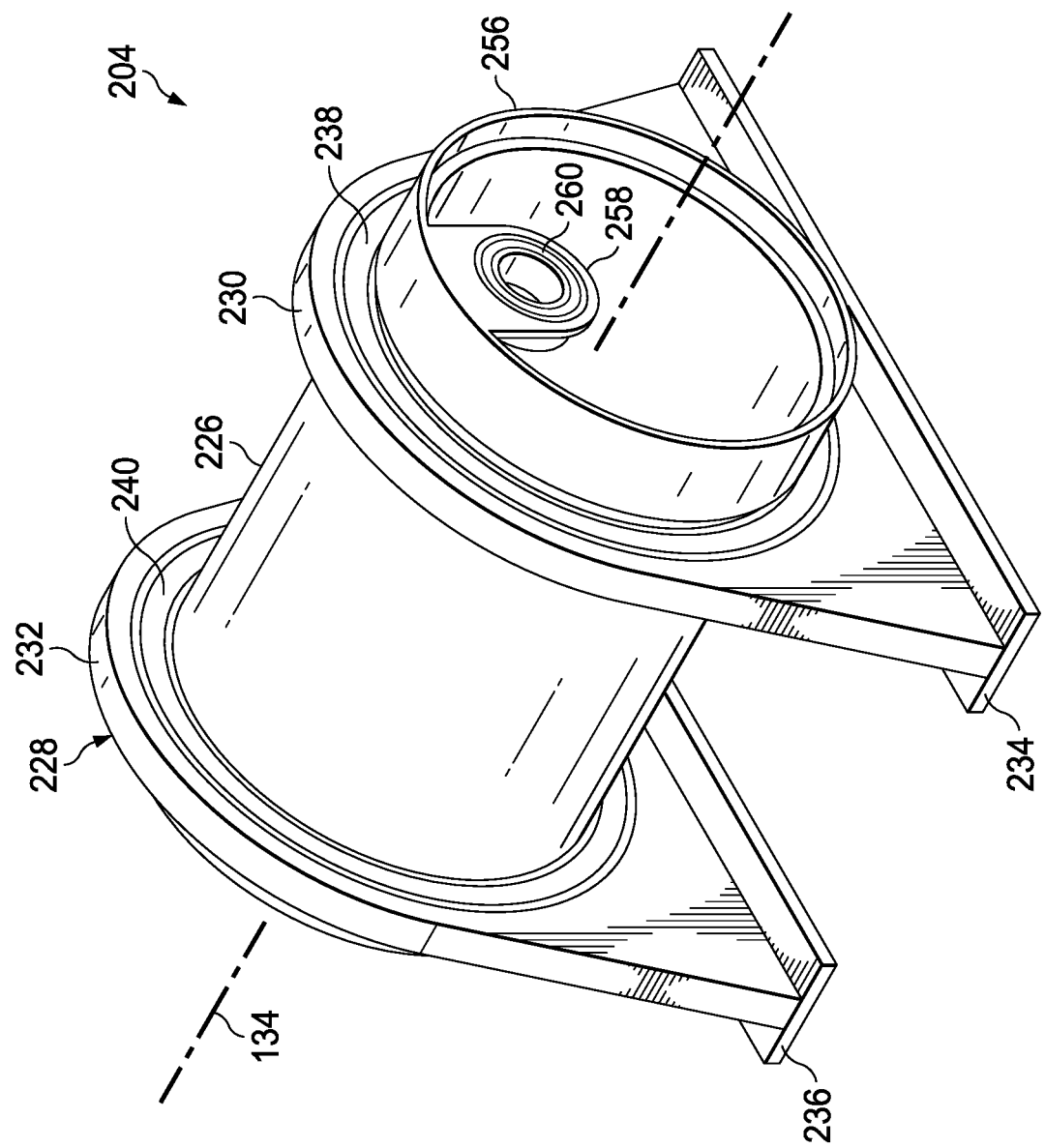
FIG. 4C is an oblique view of a second portion of the differential thrust vectoring system of FIG. 4A.

Referring now to FIGS. 4A-4C, a differential thrust vectoring system 200 is illustrated with reference to use with aircraft 100. Differential thrust vectoring system 200 includes a first thruster rotation assembly 202, a second thruster rotation assembly 204, an actuator 206, and a planetary gear system 208. As shown in FIGS. 4A and 4B, first thruster rotation assembly 202 includes a first spindle 210 configured to be coupled to first thruster 118 for common rotation therewith about tilt axis 134. First spindle 210 may include a flange for axial bolting to attachment post 140. Alternatively, or additionally, first spindle 210 may fit inside attachment post 140, or attachment post 140 may fit inside first spindle 210, to provide for radial bolting. First spindle 210 is rotatably coupled to a first pillow block assembly 212 which includes a first pedestal 214 and a second pedestal 216 axially spaced from first pedestal 214. First pedestal 214 and second pedestal 216 are configured to be coupled to the airframe via plates 218 and 220, respectively. First spindle 210 is rotatably coupled to first pedestal 214 and second pedestal 216 via roller bearings 222 and 224, respectively. While first pillow block assembly 212 is shown with two pedestals, it should be understood that it may include one or more.

As shown in FIGS. 4B and 4C, second thruster rotation assembly 204 includes a second spindle 226 configured to be coupled to second thruster 120 for common rotation therewith about tilt axis 134. Second spindle 226 may include a flange for axial bolting to the attachment post of second thruster 120. Alternatively, or additionally, second spindle 226 may fit inside the attachment post, or the attachment post may fit inside second spindle 226, to provide for radial bolting. Second spindle 226 is rotatably coupled to a second pillow block assembly 228 which includes a first pedestal 230 and a second pedestal 232 axially spaced from first pedestal 230. First pedestal 230 and second pedestal 232 are configured to be coupled to the airframe via plates 234 and 236, respectively. Second spindle 226 is rotatably coupled to first pedestal 230 and second pedestal 232 via roller bearings 238 and 240, respectively. While second pillow block assembly 228 is shown with two pedestals, it should be understood that it may include one or more.

As shown in FIG. 4A, planetary gear system 208 includes a ring gear 242, a plurality of planetary gears 244, and a sun gear 246. Ring gear 242 is coupled to first spindle 210 for common rotation therewith about tilt axis 134. Ring gear 242 includes a pair of tabs 248 configured to rotatably couple ring gear 242 to actuator 206. As such, actuator 206 is coupled to first spindle 210 through ring gear 242. However, actuator 206 may be directly coupled to first spindle 210. Sun gear 246 is at the center of planetary gear system 208 and is fixed in position by a bracket 250. Planetary gears 244 are coupled together via a planetary gear carrier 252 which includes a post 254 extending therefrom. As shown in FIG. 4C, planetary gear system 208 further includes a band 256 coupled to second spindle 226. Band 256 includes a projection 258 containing a roller bearing 260 configured to receive post 254 therein. While planetary gear system 208 is shown with a non-rotatable sun gear 246, it should be understood that that instead, ring gear 242 may be fixed and planetary gear carrier 252 is coupled to first spindle 210 and actuator 206 while sun gear is coupled for common rotation with second spindle 226.

In operation, actuation of actuator 206 causes ring gear 242, first spindle 210, and first thruster 118 to rotate together about tilt axis 134. Because sun gear 246 is fixed, rotation of ring gear 242 causes planetary gears 244, along with planetary gear carrier 252, band 256, second spindle 226, and second thruster 120, to also rotate about tilt axis 134, but at a slower rate of rotation. That is, actuation of actuator 206 will cause both first thruster 118 and second thruster 120 to rotate about tilt axis 134, but first thruster 118 will rotate further than second thruster 120. This may be particularly useful on a compound helicopter. For example, in forward-flight mode of aircraft 100, actuator 206 is in a first position wherein first thrust vector 132 and second thrust vector 152 are substantially parallel (as shown in FIG. 1), and anti-torque is provided by vertical stabilizers 106. When it is desirable to transition to hover mode, actuator 206 is actuated to a second position, wherein first thrust vector 132 and second thrust vector 152 are skewed to a predetermined angle (as shown in FIG. 2). Because first thrust vector 132 has rotated past main mast axis 114 and second thrust vector 152 has not, the thrust produced along those vectors provides anti-torque to overcome the torque effects generated by main rotor 110.

While differential thrust vectoring system 200 is shown with actuator 206 as a linear actuator, it should be understood that actuator 206 may comprise a rotary actuator. Moreover, actuator 206 may be pneumatic, hydraulic, electric, or electromagnetic. In addition, differential thrust vectoring system 200 may be configured such that failure of actuator 206 results in first thruster 118 and second thruster 120 automatically defaulting to either the hover position or the forward flight position, depending on the mission of the aircraft 100 and the preference for a vertical landing versus a horizontal landing. Furthermore, differential thrust vectoring system 200 may be configured to permit a variety of types of power transfer therethrough to the mechanisms configured to deliver rotational energy to rotor assembly 122 and rotor assembly 142. For example, differential thrust vectoring system 200 may be configured to position a gearbox between first thruster rotation assembly 202 and second thruster rotation assembly 204 wherein a first driveshaft may pass through an opening in sun gear 246 and extend through first spindle 210 to provide rotational energy to first rotor assembly 122 and a second driveshaft may pass through second spindle 226 to provide rotational energy to second rotor assembly 142. Alternatively, first spindle 210 and second spindle 226 may be configured to pass electrical power via cables to electric motors housed within stator hub 136 and stator hub 156 or pass hydraulic power via tubing to hydraulic motors housed with stator hub 136 and stator hub 156. First spindle 210 and second spindle 226 may be configured to pass the cables or tubing through the entire lengths thereof and/or they may include openings in the sidewalls configured to pass the cables or tubing therethrough.

Figure 5A:
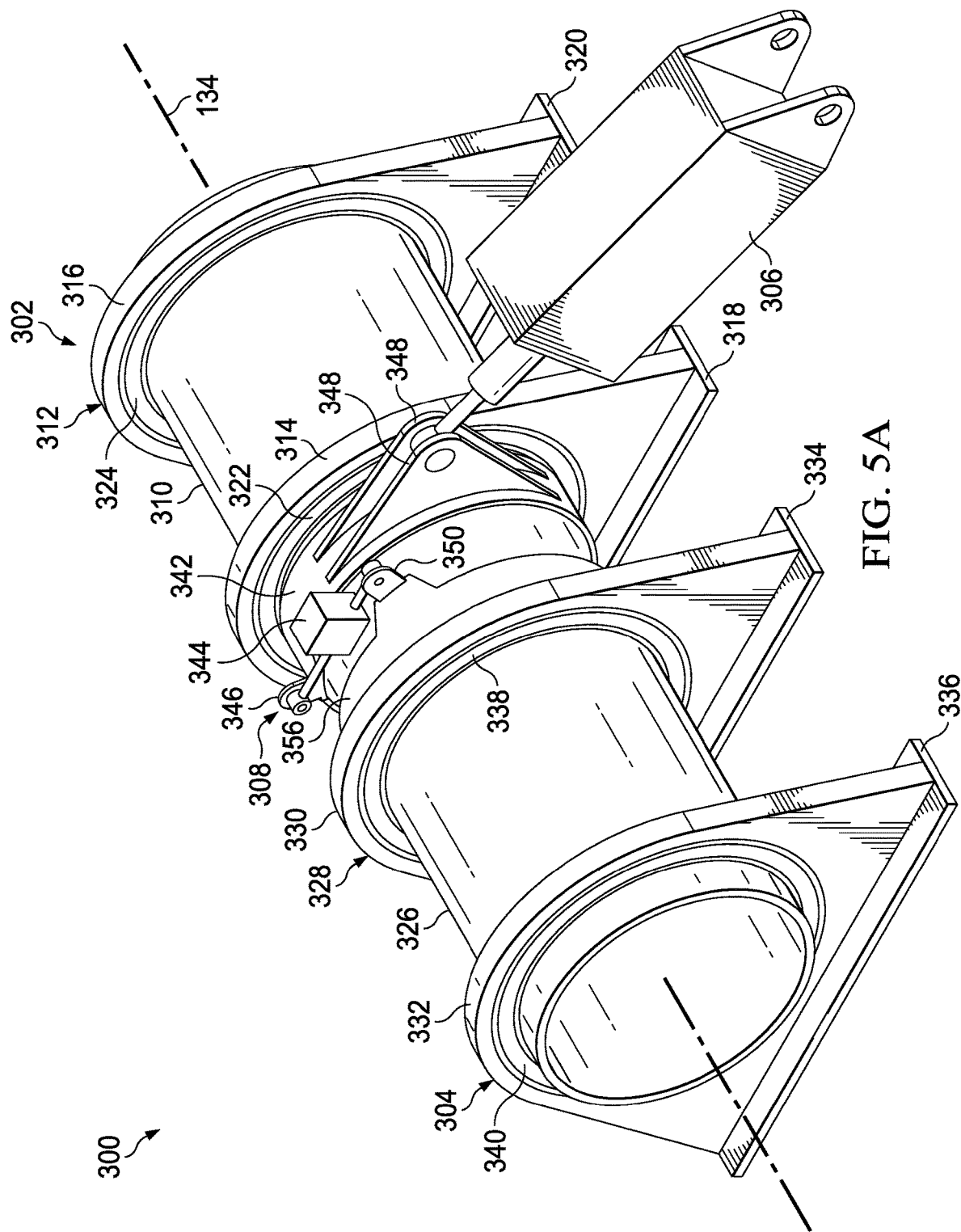
FIG. 5A is an oblique view of another differential thrust vectoring system, according to this disclosure.
Figure 5B:
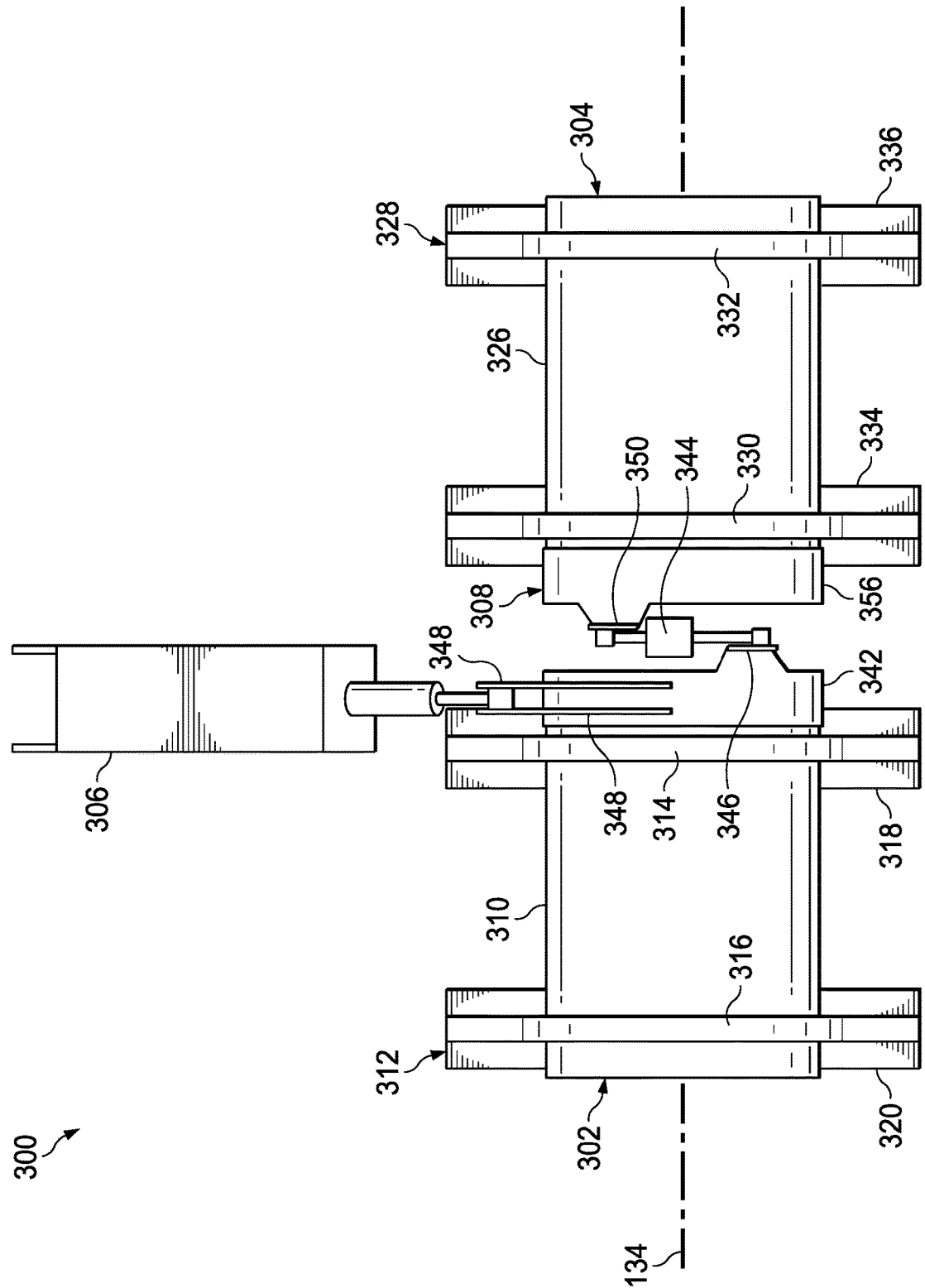
FIG. 5B is a top view of the differential thrust vectoring system of FIG. 5A.

Referring now to FIGS. 5A and 5B, a differential thrust vectoring system 300 is illustrated with reference to use with aircraft 100. Differential thrust vectoring system 300 includes a first thruster rotation assembly 302, a second thruster rotation assembly 304, a linear main actuator 306, and a linear trim actuator assembly 308. First thruster rotation assembly 302 includes a first spindle 310 configured to be coupled to first thruster 118 for common rotation therewith about tilt axis 134. First spindle 310 may include a flange for axial bolting to attachment post 140. Alternatively, or additionally, first spindle 310 may fit inside attachment post 140, or attachment post 140 may fit inside first spindle 310, to provide for radial bolting. First spindle 310 is rotatably coupled to a first pillow block assembly 312 which includes a first pedestal 314 and a second pedestal 316 axially spaced from first pedestal 314. First pedestal 314 and second pedestal 316 are configured to be coupled to the airframe via plates 318 and 320, respectively. First spindle 310 is rotatably coupled to first pedestal 314 and second pedestal 316 via roller bearings 322 and 324, respectively. While first pillow block assembly 312 is shown with two pedestals, it should be understood that it may include one or more.

Second thruster rotation assembly 304 includes a second spindle 326 configured to be coupled to second thruster 120 for common rotation therewith about tilt axis 134. Second spindle 326 may include a flange for axial bolting to the attachment post of second thruster 120. Alternatively, or additionally, second spindle 326 may fit inside the attachment post, or the attachment post may fit inside second spindle 326, to provide for radial bolting. Second spindle 326 is rotatably coupled to a second pillow block assembly 328 which includes a first pedestal 330 and a second pedestal 332 axially spaced from first pedestal 330. First pedestal 330 and second pedestal 332 are configured to be coupled to the airframe via plates 334 and 336, respectively. Second spindle 326 is rotatably coupled to first pedestal 330 and second pedestal 332 via roller bearings 338 and 340, respectively. While second pillow block assembly 328 is shown with two pedestals, it should be understood that it may include one or more.

Linear trim actuator assembly 308 includes a ring 342 coupled to first spindle 310, a band 356 coupled to second spindle 326, and a linear trim actuator 344 coupled between ring 342 and band 356. Ring 342 includes a pair of tabs 348 configured to rotatably couple ring 342 to linear main actuator 306. As such, linear main actuator 306 is coupled to first spindle 310 through ring 342. However, linear main actuator 306 may be directly coupled to first spindle 310. Ring 342 further includes a projection 346 configured to rotatably couple to linear trim actuator 344. Band 356 includes also includes a projection 350 configured to rotatably couple to linear trim actuator 344.

In operation, actuation of linear main actuator 306 causes ring 342, first spindle 310, and first thruster 118 to rotate together about tilt axis 134. Because ring 342 is coupled to band 356 via linear trim actuator 344, second spindle 326 and second thruster 120 also rotate about tilt axis 134 in response to actuation of linear main actuator 306. Differential rotation of first thruster 118 and second thruster 120 is provided by linear trim actuator 344. That is, actuation of linear trim actuator 344 causes band 356, second spindle 326, and second thruster 120 to rotate relative to ring 342, first spindle 310, and first thruster 118. Accordingly, in forward-flight mode of aircraft 100, both linear main actuator 306 and linear trim actuator 344 are in first positions, wherein first thrust vector 132 and second thrust vector 152 are substantially parallel (as shown in FIG. 1), and anti-torque is provided by vertical stabilizers 106. When it is desirable to transition to hover mode, both linear main actuator 306 and linear trim actuator 344 are actuated to second positions, and first thrust vector 132 and second thrust vector 152 are skewed to a predetermined angle (as shown in FIG. 2). Because first thrust vector 132 has rotated past main mast axis 114 and second thrust vector 152 has not, the thrust produced along those vectors provides anti-torque to overcome the torque effects generated by main rotor 110. Further actuation of linear main actuator 306 and linear trim actuator 344 can further vary the angle between first thrust vector 132 and second thrust vector 152, thereby varying the rotational force on aircraft 100 and providing yaw control. The same principal can be applied during forward-flight mode. That is, deviation of first thrust vector 132 and second thrust vector 152 from the substantially parallel orientation during forward flight can provide roll capabilities.

Linear main actuator 306 and linear trim actuator 344 may be pneumatic, hydraulic, electric, or electromagnetic. In addition, differential thrust vectoring system 300 may be configured such that failure of linear main actuator 306 and/or linear trim actuator 344 results in first thruster 118 and second thruster 120 automatically defaulting to either the hover position or the forward-flight position, depending on the mission of the aircraft 100 and the preference for a vertical landing versus a horizontal landing. Furthermore, differential thrust vectoring system 300 may be configured to permit a variety of types of power transfer therethrough to the mechanisms configured to deliver rotational energy to rotor assembly 122 and rotor assembly 142. For example, differential thrust vectoring system 300 may be configured to position a gearbox between first thruster rotation assembly 302 and second thruster rotation assembly 304 wherein a first driveshaft may pass through first spindle 310 to provide rotational energy to first rotor assembly 122 and a second driveshaft may pass through second spindle 326 to provide rotational energy to second rotor assembly 142. Alternatively, first spindle 310 and second spindle 326 may be configured to pass electrical power via cables to electric motors housed within stator hub 136 and stator hub 156 or pass hydraulic power via tubing to hydraulic motors housed with stator hub 136 and stator hub 156. First spindle 310 and second spindle 326 may be configured to pass the cables or tubing through the entire lengths thereof and/or they may include openings in the sidewalls configured to pass the cables or tubing therethrough.

Figure 6A:
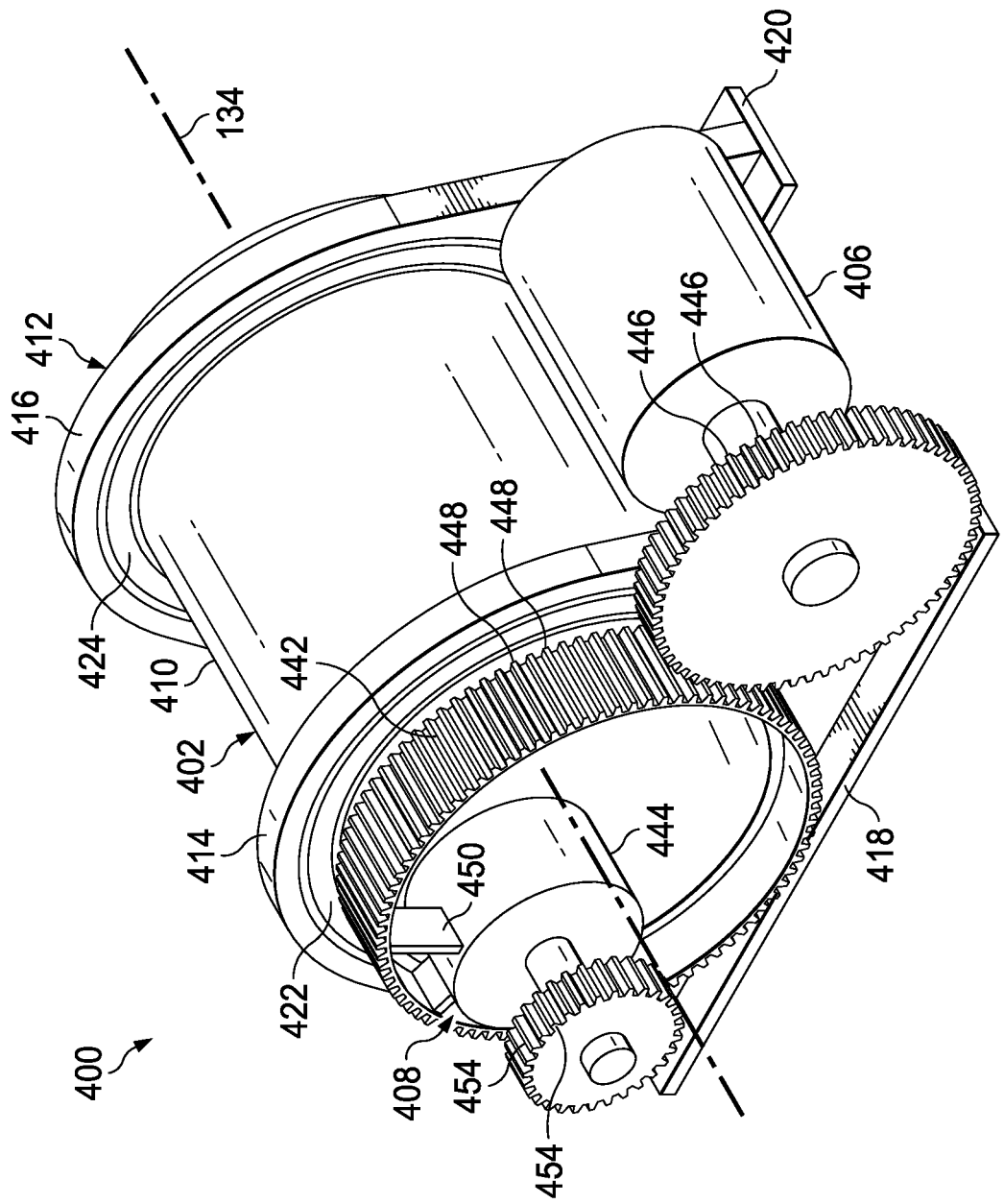
FIG. 6A is an oblique view of a first portion of another differential thrust vectoring system, according to this disclosure.
Figure 6B:
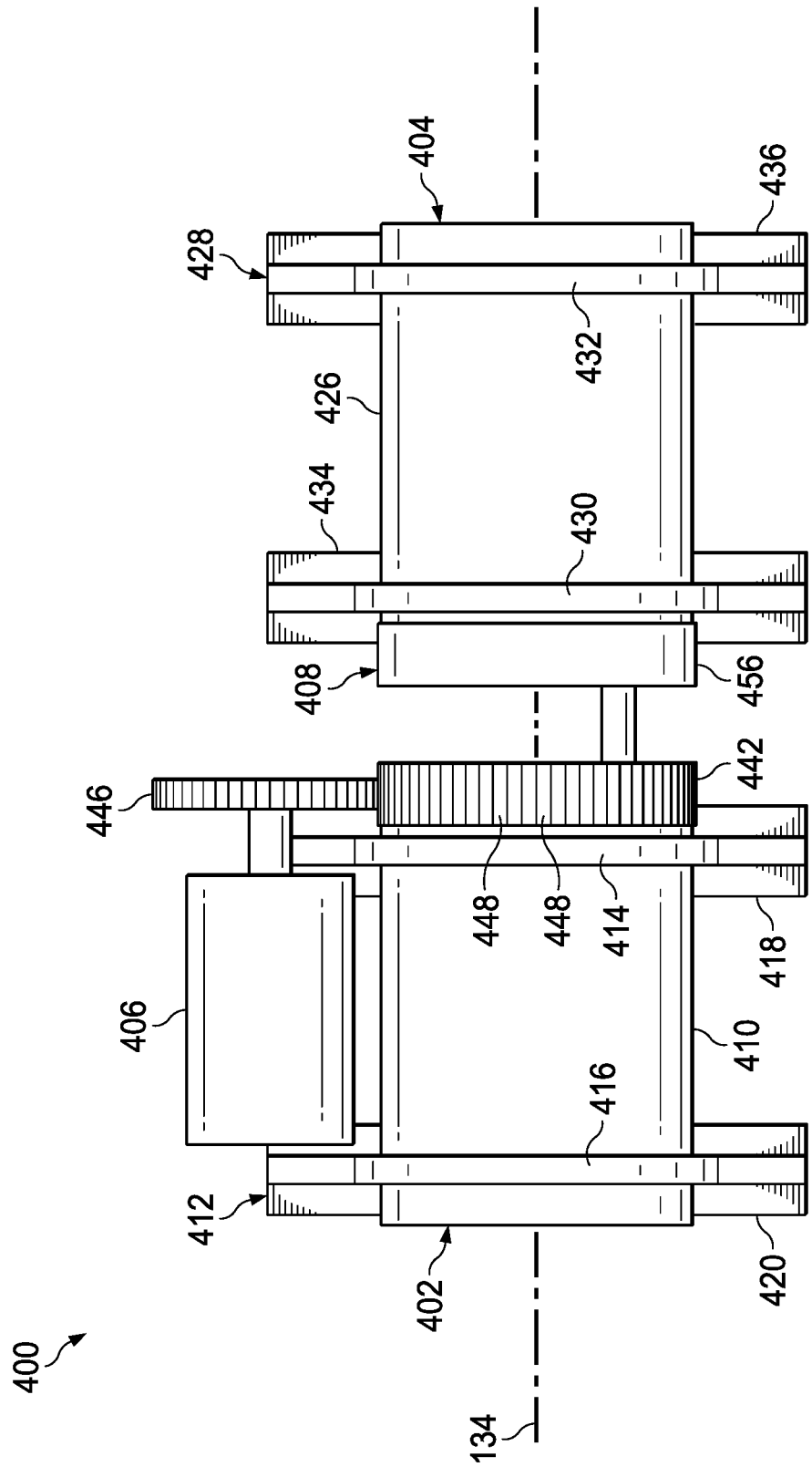
FIG. 6B is a top view of the differential thrust vectoring system of FIG. 6A.
Figure 6C:
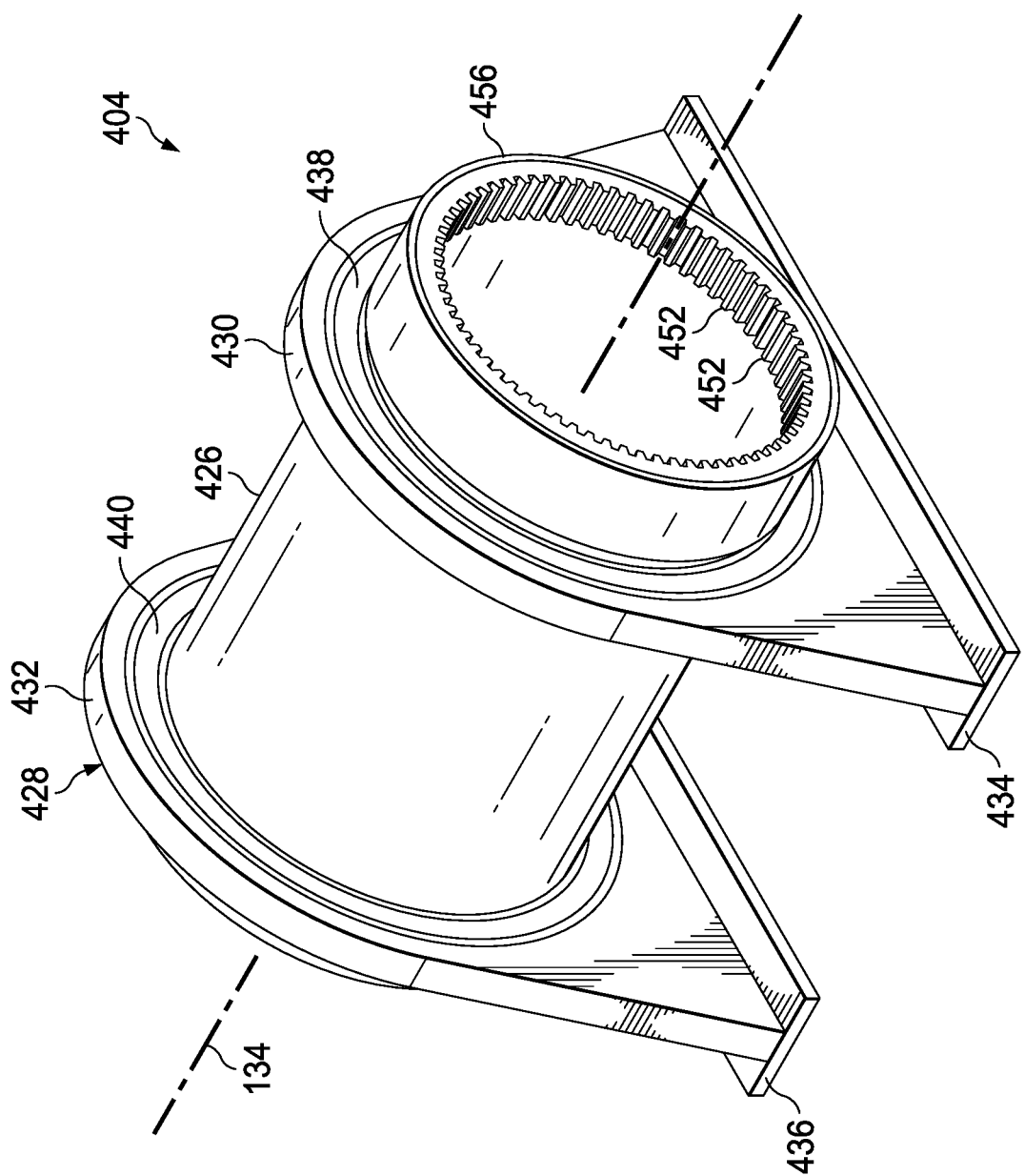
FIG. 6C is an oblique view of a second portion of the differential thrust vectoring system of FIG. 6A.

Referring now to FIGS. 6A-6C, a differential thrust vectoring system 400 is illustrated with reference to use with aircraft 100. Differential thrust vectoring system 400 includes a first thruster rotation assembly 402, a second thruster rotation assembly 404, a rotary main actuator 406, and a rotary trim actuator assembly 408. As shown in FIGS. 6A and 6B, first thruster rotation assembly 402 includes a first spindle 410 configured to be coupled to first thruster 118 for common rotation therewith about tilt axis 134. First spindle 410 may include a flange for axial bolting to attachment post 140. Alternatively, or additionally, first spindle 410 may fit inside attachment post 140, or attachment post 140 may fit inside first spindle 410, to provide for radial bolting. First spindle 410 is rotatably coupled to a first pillow block assembly 412 which includes a first pedestal 414 and a second pedestal 416 axially spaced from first pedestal 414. First pedestal 414 and second pedestal 416 are configured to be coupled to the airframe via plates 418 and 420, respectively. First spindle 410 is rotatably coupled to first pedestal 414 and second pedestal 416 via roller bearings 422 and 424, respectively. While first pillow block assembly 412 is shown with two pedestals, it should be understood that it may include one or more.

As shown in FIGS. 6B and 6C, second thruster rotation assembly 404 includes a second spindle 426 configured to be coupled to second thruster 120 for common rotation therewith about tilt axis 134. Second spindle 426 may include a flange for axial bolting to the attachment post of second thruster 120. Alternatively, or additionally, second spindle 426 may fit inside the attachment post, or the attachment post may fit inside second spindle 426, to provide for radial bolting. Second spindle 426 is rotatably coupled to a second pillow block assembly 428 which includes a first pedestal 430 and a second pedestal 432 axially spaced from first pedestal 430. First pedestal 430 and second pedestal 432 are configured to be coupled to the airframe via plates 434 and 436, respectively. Second spindle 426 is rotatably coupled to first pedestal 430 and second pedestal 432 via roller bearings 438 and 440, respectively. While second pillow block assembly 428 is shown with two pedestals, it should be understood that it may include one or more.

Rotary trim actuator assembly 408 includes a first ring gear 442 coupled to first spindle 410, a second ring gear 456 coupled to second spindle 426, and a rotary trim actuator 444 coupled between first ring gear 442 and second ring gear 456. First ring gear 442 includes external teeth 448 configured to mesh with external teeth 446 of rotary main actuator 406. As such, rotary main actuator 406 is coupled to first spindle 410 through first ring gear 442. First ring gear 442 further includes a bracket 450 configured to couple rotary trim actuator 444 thereto. Second ring gear 456 includes internal teeth 452 configured to mesh with external teeth 454 of rotary trim actuator 444.

In operation, actuation of rotary main actuator 406 causes first ring gear 442, first spindle 410, and first thruster 118 to rotate together about tilt axis 134. Because first ring gear 442 is coupled to second ring gear 456 via rotary trim actuator 444, second spindle 426 and second thruster 120 also rotate about tilt axis 134 in response to actuation of rotary main actuator 406. Differential rotation of first thruster 118 and second thruster 120 is provided by rotary trim actuator 444. That is, actuation of rotary trim actuator 444 causes second ring gear 456, second spindle 426, and second thruster 120 to rotate relative to first ring gear 442, first spindle 410, and first thruster 118. Accordingly, in forward-flight mode of aircraft 100, both rotary main actuator 406 and rotary trim actuator 444 are in first positions, wherein first thrust vector 132 and second thrust vector 152 are substantially parallel (as shown in FIG. 1), and anti-torque is provided by vertical stabilizers 106. When it is desirable to transition to hover mode, both rotary main actuator 406 and rotary trim actuator 444 are actuated to second positions, and first thrust vector 132 and second thrust vector 152 are skewed to a predetermined angle (as shown in FIG. 2). Because first thrust vector 132 has rotated past main mast axis 114 and second thrust vector 152 has not, the thrust produced along those vectors provides anti-torque to overcome the torque effects generated by main rotor 110. Further actuation of rotary main actuator 406 and rotary trim actuator 444 can further vary the angle between first thrust vector 132 and second thrust vector 152, thereby varying the rotational force on aircraft 100 and providing yaw control. The same principal can be applied during forward-flight mode. That is, deviation of first thrust vector 132 and second thrust vector 152 from the substantially parallel orientation during forward flight can provide roll capabilities.

Rotary main actuator 406 and rotary trim actuator 444 may be pneumatic, hydraulic, electric, or electromagnetic. In addition, differential thrust vectoring system 400 may be configured such that failure of rotary main actuator 406 and/or rotary trim actuator 444 results in first thruster 118 and second thruster 120 automatically defaulting to either the hover position or the forward-flight position, depending on the mission of the aircraft 100 and the preference for a vertical landing versus a horizontal landing. Furthermore, differential thrust vectoring system 400 may be configured to permit a variety of types of power transfer therethrough to the mechanisms configured to deliver rotational energy to rotor assembly 122 and rotor assembly 142. For example, differential thrust vectoring system 400 may be configured to position a gearbox between first thruster rotation assembly 402 and second thruster rotation assembly 404 wherein a first driveshaft may pass through first spindle 410 to provide rotational energy to first rotor assembly 122 and a second driveshaft may pass through second spindle 426 to provide rotational energy to second rotor assembly 142. Alternatively, first spindle 410 and second spindle 426 may be configured to pass electrical power via cables to electric motors housed within stator hub 136 and stator hub 156 or pass hydraulic power via tubing to hydraulic motors housed with stator hub 136 and stator hub 156. First spindle 410 and second spindle 426 may be configured to pass the cables or tubing through the entire lengths thereof and/or they may include openings in the sidewalls configured to pass the cables or tubing therethrough.

While differential thrust vectoring systems 200, 300, and 400 are referenced for use with aircraft 100, a compound helicopter, it should be understood that they may be utilized on any aircraft that may benefit from altering the thrust vectors of a pair of thrusters.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:
1. A differential thrust vectoring system, comprising:
   a first spindle configured to be coupled for common rotation about a tilt axis with a first thruster;
   a second spindle configured to be coupled for common rotation about the tilt axis with a second thruster;
   a main actuator configured to be coupled between the first spindle and an airframe; and
   a trim actuator coupled between the first spindle and the second spindle;
   wherein the differential thrust vectoring system is configured such that actuation of the main actuator would cause common rotation about the tilt axis of the first spindle and the second spindle and actuation of the trim actuator would cause rotation about the tilt axis of the second spindle relative to the first spindle.
2. The differential thrust vectoring system of claim 1, wherein the main actuator is either a linear actuator or a rotary actuator and the trim actuator is either a linear actuator or a rotary actuator, and the main actuator is one of pneumatic, hydraulic, electric, and electromagnetic, and the trim actuator is one of pneumatic, hydraulic, electric, and electromagnetic.

3. The differential thrust vectoring system of claim 1, wherein the first spindle and the second spindle are configured to transmit at least one of mechanical, electrical, and hydraulic power therethrough.

4. The differential thrust vectoring system of claim 1, wherein the differential thrust vectoring system is configured such that failure of the trim actuator and/or the main actuator will result in thrust vectors of the first thruster and the second thruster assuming a substantially parallel relationship.

5. The differential thrust vectoring system of claim 1, wherein the differential thrust vectoring system is configured such that failure of the trim actuator and/or the main actuator will result in thrust vectors of the first thruster and the second thruster assuming a predetermined skewed relationship.

6. The differential thrust vectoring system of claim 1, wherein the trim actuator is configured to move between a first position, wherein a first thrust vector of the first thruster is substantially parallel to a second thrust vector of the second thruster, and a second position, wherein the first thrust vector is askew to the second thrust vector.

7. The system of claim 1, wherein the actuators are configured to assume a hover position in failure.

8. An aircraft, comprising:
a fuselage;
an airframe;
a first thruster having a first thrust vector;
a second thruster having a second thrust vector; and
a differential thrust vectoring system, comprising:
 a first spindle coupled for common rotation about a tilt axis with the first thruster;
 a second spindle coupled for common rotation about the tilt axis with the second thruster;
 a main actuator coupled between the first spindle and the airframe; and
 a trim actuator coupled between the first spindle and the second spindle;
wherein the differential thrust vectoring system is configured such that actuation of the main actuator causes rotation about the tilt axis of the first spindle and the second spindle; and
wherein the differential thrust vectoring system is configured such that actuation of the trim actuator causes rotation about the tilt axis of the second spindle relative to the first spindle.

9. The aircraft of claim 8, further comprising:
a main rotor;
wherein when the actuator is in a forward-flight position the first thrust vector and the second thrust vector are substantially parallel and when the actuator is in a hover position the first thrust vector and the second thrust vector are skewed, wherein an angle between the first thrust vector and the second thrust vector are configured to counter a torque effect of the main rotor.

10. The aircraft of claim 9, further comprising:
a vertical stabilizer configured to counter the torque effect of the main rotor during forward flight.

11. The aircraft of claim 8, wherein the first thruster and the second thruster comprise ducted fans.

12. The aircraft of claim 9, wherein the actuators are configured to assume the hover position in failure.

13. The aircraft of claim 8, wherein the differential thrust vectoring system is configured such that failure of the trim actuator and/or the main actuator will result in the first thrust vector and the second thrust vector assuming a substantially parallel relationship or a predetermined skewed relationship.

* * * * *